(12) United States Patent
Yavitz et al.

(10) Patent No.: US 6,473,792 B1
(45) Date of Patent: *Oct. 29, 2002

(54) METHOD OF SIMULATING BROADBAND INTERNET CONTENT DOWNLOADS

(75) Inventors: Edward Q. Yavitz, 3828 Spring Creek, Rockford, IL (US) 61114; Adam Q. Yavitz, Rockford, IL (US); Noah B. Yavitz, Rockford, IL (US)

(73) Assignees: Lory Suby, Rockford, IL (US); Edward Q. Yavitz, Rockford, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/523,253

(22) Filed: Mar. 10, 2000

Related U.S. Application Data

(63) Continuation-in-part of application No. 09/484,334, filed on Jan. 18, 2000.

(51) Int. Cl.[7] .......................... G06F 15/16; G06F 9/445; H04M 1/00
(52) U.S. Cl. .......................... 709/217; 717/177; 455/557
(58) Field of Search .................. 709/217–219; 455/557; 717/71–173, 176–178

(56) References Cited

U.S. PATENT DOCUMENTS

| 5,790,958 A | | 8/1998 | McCoy et al. ............. 455/557 |
| 6,011,537 A | * | 1/2000 | Slotznick |
| 6,021,433 A | | 2/2000 | Payne et al. ................ 706/219 |
| 6,096,096 A | * | 8/2000 | Murphy et al. |

* cited by examiner

*Primary Examiner*—John A. Follansbee
(74) *Attorney, Agent, or Firm*—Fletcher, Yoder & Van Someren

(57) ABSTRACT

A broadcast reception system or display system is combined with a computer. The reception system includes a receiver that is integrated with a computer, e.g. personal computer. The receiver may be configured to receive analog FM signals and linked data transmitted according to at least one of the RDS and MBS standards. The data serves as a data trigger to provide the user with a prompt on the computer system. The prompt may be utilized to access information related to the primary radio broadcast and previously stored at a memory location, such as a computer disk drive, CD or floppy disk. This permits a user to quickly and easily access large amounts of information relevant to the current programming of a given radio station or to purchase music, goods and services as they are featured in the FM broadcast.

26 Claims, 8 Drawing Sheets

METHOD OF SIMULATING BROADBAND INTERNET CONTENT DOWNLOADS

CROSS REFERENCE TO RELATED APPLICATIONS

This patent application is a continuation-in-part of patent application Ser. No. 09/484,334, filed Jan. 18, 2000, entitled, "Computer-Based RDS/MBS Receiver System For Use With Radio Broadcast Signal".

FIELD OF THE INVENTION

The present invention relates generally to a method and system for providing a user with enhanced information related to subject matter made available to an individual via a medium, such as a broadcast medium, and particularly to the utilization of a data trigger to automatically and quickly access the enhanced information stored at a receiver system and directly related to the subject matter.

BACKGROUND OF THE INVENTION

A large percentage of Internet transactions are canceled because of the time it takes to download information and/or complete a transaction. Modem speeds and bandwidth is a critical stumbling block for Internet commerce. For example, advertisers are interested in developing rich media ads that present active audio, video and new browser windows to computer users. However, such ads require relatively large amounts of digital data, and the infrastructure for downloading such data to a computer or other device for display is limited. If the transmission of data is too slow, the real time display of video or playing of audio is undesirable because the end quality of such material is poor. On the other hand, if such materials are downloaded to a device, such as a personal computer, the download requires unacceptable amounts of time that can result in a dissatisfied customer or interruption of the download by the end user.

It would be advantageous to have a system and method able to provide the appearance of faster download times without necessarily improving the actual speed of a device's modem and/or the speed of data transmission to that device.

SUMMARY OF THE INVENTION

The present invention features a method for rapidly accessing information related to a media display. The method includes storing segments of enhanced information on a device configured to receive a media display. The segments of enhanced information are related to corresponding segments of the media display. The method further includes providing the device with a user interface, and prompting an individual to retrieve a segment of enhanced information as the corresponding segment of the media display is being displayed. The method further includes retrieving the specific segment of enhanced information upon response to the prompting by an individual.

According to another aspect of the invention, a method is provided for rapidly making available to an individual information related to a currently broadcast media. The method includes broadcasting selected segments of data via a broadcast medium for reception by a plurality of remote receivers. The method also includes broadcasting a unique data trigger simultaneously with each selected segment of data. The selected segments of data and the unique data triggers are received at a receiver system, which is preloaded with information related to the selected segments of data. The method further includes using the receiver system to utilize the data trigger for automatic retrieval of information related to the currently broadcast segment of data.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

The following description is of an interactive system, typically utilizing a computer, such as a personal computer or integrated entertainment system, that allows a user to readily access information related to the music or other programming broadcast by a radio station or displayed as part of a media display. The system may also be utilized with remote devices, such as hand-held telephones and other hand held devices. As personal computers, home entertainment systems and other communication devices advance, there may be integration of personal computing systems with television and/or radio. The systems described below can be adapted to and envision such changes. The present system can also be adapted for use with other types of broadcasts, including broadcasts by television signals, cellular transmission or over a network. In any of these applications, a data trigger (as discussed below) is broadcast along with the primary broadcast and serves to provide the end user with automatic access to prestored information related to the primary content currently being broadcast or displayed. With television, for example, the data trigger can be encoded in the Vertical Blanking Interval (VBI).

One exemplary existing system that can be used in conjunction with the inventive system described below is a combined radio and personal computer as described in McCoy et al., U.S. Pat. No. 5,790,958, issued Aug. 4, 1998 and entitled Radio Reception System For General Purpose Computer. The McCoy et al. patent, U.S. Pat. No. 5,790,958, is incorporated herein by reference. The McCoy et al. patent describes a design for a radio receiver card that may be plugged into a personal computer to permit a user to receive and play radio broadcasts on his or her computer. The McCoy et al. system also receives and decodes RDS and/or MBS data transmissions in the FM stereo tuner mode and is able to display the RDS and/or MBS data on the monitor of the computer. However, the McCoy et al. patent does not disclose how to utilize the relatively small amounts of RDS and/or MBS digital data as a trigger to obtaining relatively large amounts of data related to the programming being played on a given radio station at a given time.

Figure 1:
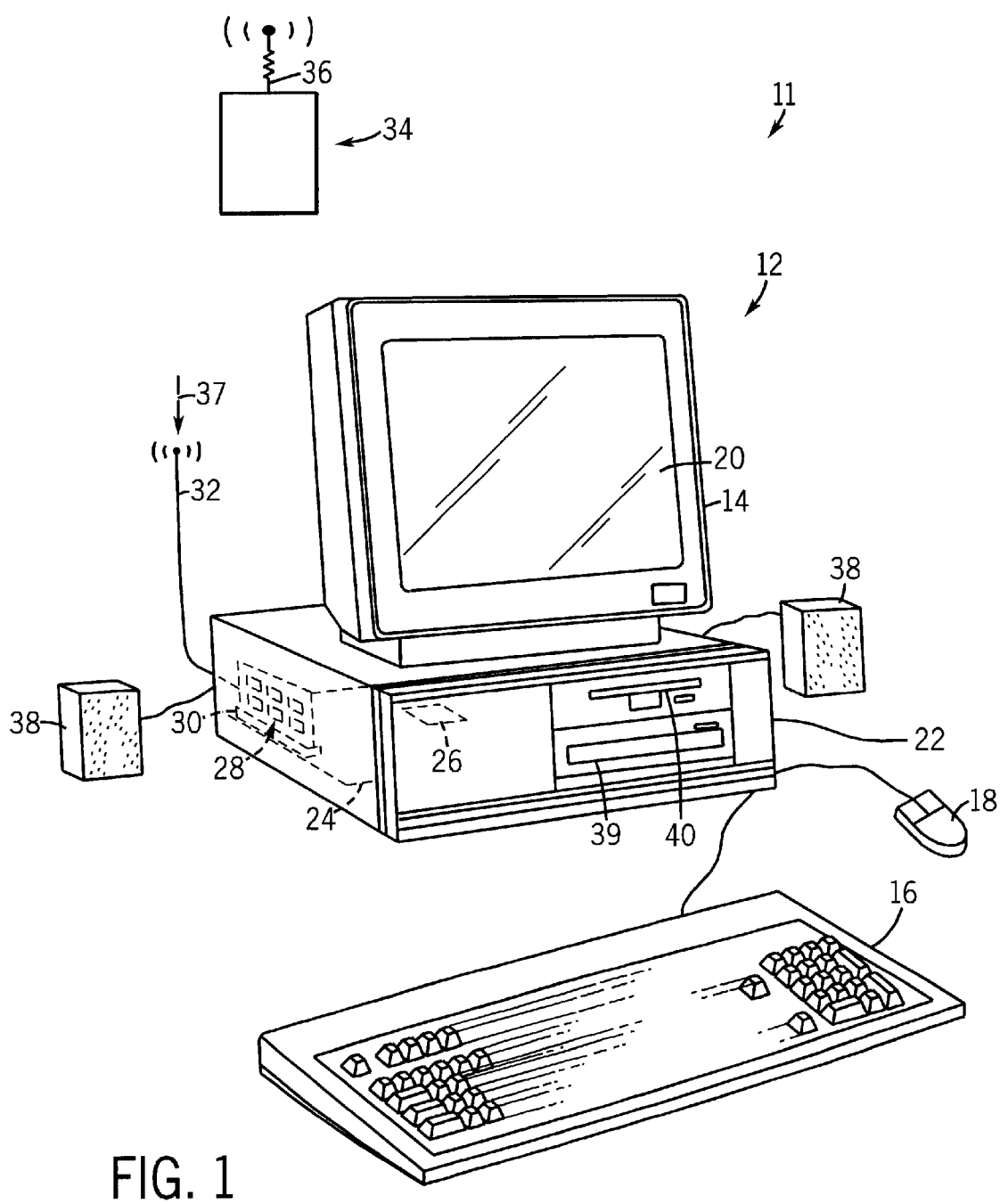
FIG. 1 is a perspective view of an exemplary system having a receiver for receiving data via FM signal radio waves.

Referring generally to FIG. 1, a radio reception system 11 is illustrated according to one exemplary embodiment of the present invention. In this exemplary embodiment, system 11 includes a personal computer 12 having a user interface that may include a monitor 14, a keyboard 16 and a mouse 18. Monitor 14 may have a variety of forms, including CRT or flat screen displays. However, monitor 14 typically includes a display screen 20 for displaying a variety of information to the user. It should be noted that a variety of other devices, including hand-held devices, can be utilized. Typically, such device including a processor that cooperates with a display and a user interface. Exemplary devices include web radio receivers, such as those available from Kerbango or iradios and other devices, such as the Palm Pilot available from 3Com.

Personal computer system 12 also includes a housing 22 containing a motherboard 24 upon which a variety of computer circuit components, including a processor 26, are mounted. Additionally, a radio data reception system 28 is coupled to the motherboard 24. Radio data reception system 28 includes, for example, an FM tuner and digital data decoder card 30 that is connected to motherboard 24, as shown. Card 30 may be a printed circuit board style card configured for pluggable engagement with personal computer 12 at, for example, a USB or PCI slot. Radio data reception system 28 also includes a reception antenna 32 that is attached to FM tuner and digital data decoder card 30 to receive analog and/or digital FM signals and digital RDS signals transmitted over the airwaves from a radio broadcast station 34 having a broadcast antenna 36.

In the exemplary embodiment illustrated, FM radio signals are processed by the computer 12 for playback of audio signals through one or more speakers 38 attached to computer 12. Computer 12 also processes any RDS and/or MBS digital data received from the radio transmission. This RDS/MBS data contains a digital or data trigger 37 that provides a prompt on display screen 20 to a user and permits the user to automatically obtain additional information about the music or other programming being broadcast on the primary FM radio signal via radio station 34. The additional information which has been stored prior to the broadcast, for example, can be liner notes to the music containing information related to the musician or musicians responsible for the music being played, additional information about upcoming concerts, weblinks to the musicians or to Internet CD vendors whereby the listener can order the music as it is heard with a single click of the mouse. Other prompts that may appear on screen include information related to an advertisement or products/services advertised, information about commentators or disc jockeys providing commentary, etc. The programming code included with the previously downloaded material allows the listener to establish accounts with advertisers or CD vendors in order to make split second purchasing decisions when prompted by the music or advertised offers. The radio reception system 11 permits the user to obtain this information automatically as the programming takes place.

It should be noted that the exemplary personal computer 12 also includes a CD drive 39 and a floppy disk drive 40. CD drive 39 and disk drive 40 provide potential locations for storage of data, via CD or floppy disk, or for the downloading of data related to the programming of a given radio station 34, as explained in more detail below.

Figure 2:
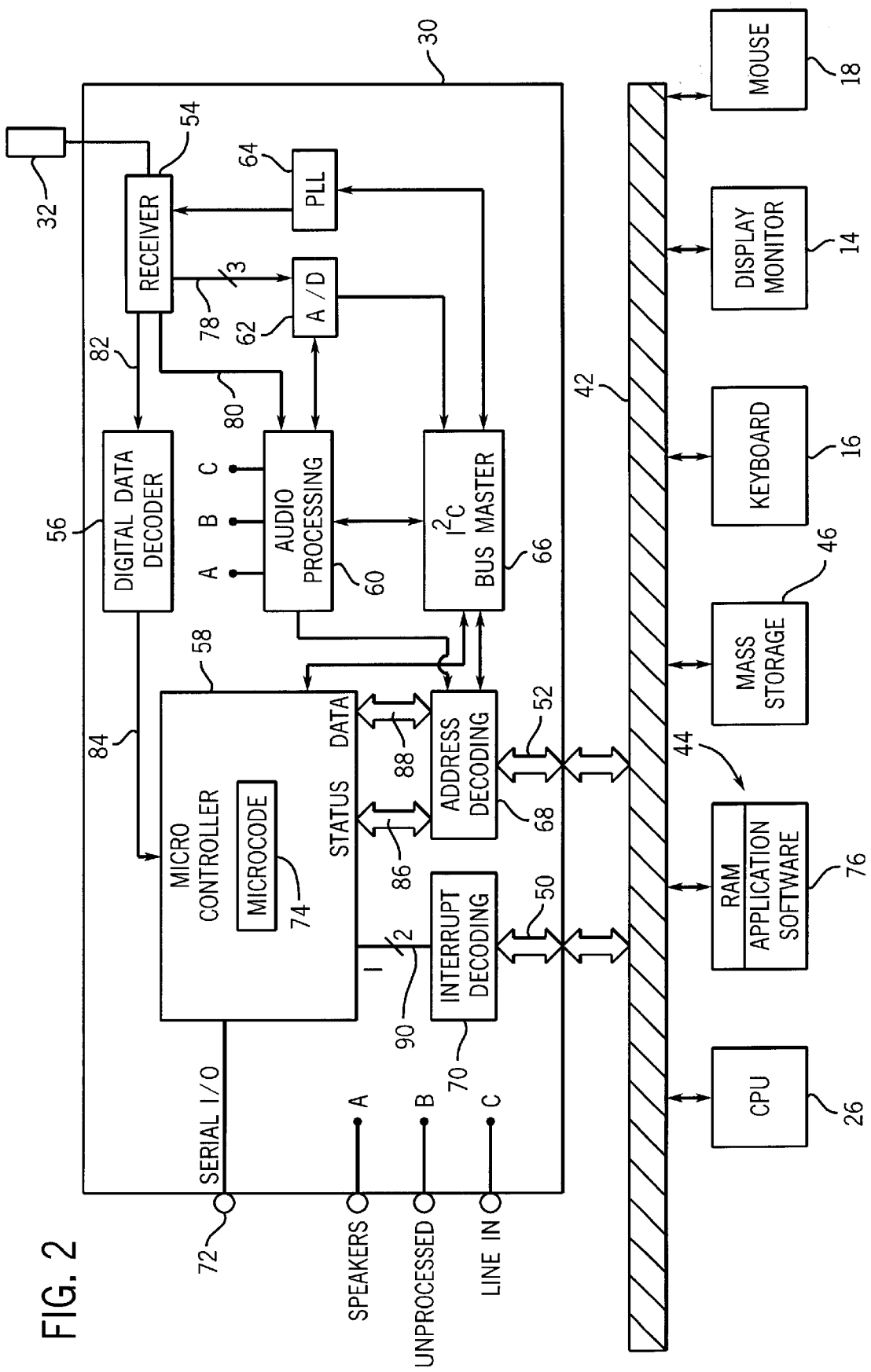
FIG. 2 is a schematic diagram depicting components of an exemplary receiver system for use in a personal computer or other data reception device.

An exemplary implementation of radio data reception system 28 and as described in U.S. Pat. No. 5,790,958 is discussed with reference to FIG. 2. In this exemplary embodiment, FM tuner and processing card 30 is connected via a bus 42, such as an ISA bus, to the components of a personal computer. The main personal computer components include a central processing unit (CPU), such as processor 26. Additionally, personal computer 12 includes a RAM memory unit 44, a mass storage unit 46, keyboard 16, display monitor 14 and mouse 18. It should be noted that it is possible to externally mount card 30 outside of personal computer 12 and connect the processing card to the computer via an external interface. Processing card 30 interfaces with bus 42 through a group of interrupt lines 50 and a group of address and data lines 52. Card 30 comprises a receiver and tuner unit 54 which is connected to antenna 32. Receiver 54 is connected to a digital data decoder 56 which, in turn, is connected to a digital data processor or microcontroller 58. The receiver 54 also is connected to an audio processing unit 60, an analog to digital converter 62 and a phased loop logic (PLL) circuit 64. A local bus controller 66, such as an $I^2C$ bus master, is connected to the devices 58, 60, 62 and 64 as shown, and is also connected to address decoding circuitry 68. The address decoding circuitry 68 and an interrupt decoding circuitry 70 are both connected to the microcontroller 58.

Processing card 30 also contains an external serial port 72 connected to microcontroller 58. Card 30 also includes three audio ports labeled A, B and C, connected to the audio processing unit 60. Audio port A is an audio output port for connection to external speakers. Audio port B is an unprocessed audio port for connection to a sound card or other audio device. Audio port C is an input port or "line-in" port for receiving audio signals to be processed by the audio processing unit 60.

In operation, processing card 30 performs stand alone functions dictated by software or microcode 74, which is resident within the microcontroller 58. Microcontroller 58 may be a standard 8051 device operating a 12 MHz. Additional functions of the processing card 30, as well as processing functions of the radio data reception system, are controlled by an application software 76 resident in the associated personal computer 12 and which may be stored in the mass storage device 46 and loaded into the computer's memory unit 44 during operation. By sharing processing functions between the card microcontroller 58 and the computer processor 26, performance of the overall system can be enhanced and optimized to take advantage of the more powerful host CPU.

Communication between the various devices of processing card 40 may be accomplished via a local 2-bit $I^2C$ bus. In the exemplary embodiment, local bus access is controlled through the $I^2C$ bus master chip 66. It should be noted that it is also possible to configure the microcontroller 58 as the bus master, thereby eliminating the need for separate bus master chip 66.

Tuning information received from the application software 76, via bus 42, is routed through the I²C bus master 66 and to the PLL 64. Similarly, audio processing parameters are routed to the audio processing unit 60 via the bus master 66. The receiver 54 locks onto the desired FM station and emits corresponding signals along paths 78, 80 and 82.

Along the data path 78, three separate signals are transmitted indicating the strength of the detected audio signal and the levels of the left and right stereo signals. This information is then digitized by the A/D converter 62 and then transferred back through bus 42 for processing and display by the application software 76. The signal containing the analog audio information is transmitted along the path 80 for further processing by the circuitry 60 before being output to the audio port A. The audio signal also is transmitted along path 82 to the digital data decoder 56. The digital data decoder 56 demodulates and decodes the digital RBDS data (either RDS or MBS) associated with the particular FM station which is tuned by receivers 54.

The digital data decoder 56 may be any number of standard decoding devices. In an exemplary embodiment, a Phillips brand model SA6574T is used. The digital data decoder 56 outputs a continuous digital data stream, and corresponding clock signal, along a path 84 for reception by microcontroller 58 for analysis and processing.

The microprocessor performs a sequence of operations to identify, decode, store and eventually transmit the RDS and/or MBS data along but 42 to the host personal computer. In the exemplary embodiment, if microcontroller 58 detects RDS data, it automatically decodes the RDS data. Similarly, if the microcontroller 58 detects MBS data, it automatically decodes the data.

Communication between microcontroller and the host personal computer, or other display/processing system is accomplished via a status port having corresponding signal lines and a data port having a corresponding signal line 88. Depending on the particular microcontroller, the data and status ports may be on-board or implemented with an external I/O device. In the exemplary embodiment, the data and status ports are 8-bit registers and the signal lines 86, 88 each contain corresponding eight individual signal paths. The status signal lines 86 serve to identify the current transfer operation performed by the microcontroller 58, and the data signal lines 88 transfer the data from the microcontroller 58 to the host computer. The data and status information from the corresponding ports is decoded by the address decode circuitry 68 and presented to the bus 42 for transfer to the host computer.

Interrupt decoding information is transferred from the microcontroller 58 to the interrupt decoding circuitry 70 along a path 90. When the microcontroller 58 wishes to interrupt the host computer, interrupt signals are processed by the decoding circuitry 70 and presented to the bus 42 over the signal lines 50. Data transfer between the microcontroller 58 and the host computer can be accomplished by an "interrupt" method or a strict "polling" method, as discussed in U.S. Pat. No. 5,790,958. Additionally, because processing card 30 may be exposed to the surrounding circuitry of the host computer, RF shielding of the card or individual components may be required to avoid interference with the audio information processed by card 30.

One of the problems with systems or methodology for utilizing RDS and/or MBS is the relatively limited amount of data that can be carried by the RDS and/or MBS signal. Thus, only small amounts of information related to the radio programming can be transferred by such mechanisms.

Accordingly, the present invention embodied in radio reception system 11 utilizes the RDS and/or MBS signal as a data trigger 37 for obtaining additional information stored at a location M (see FIG. 3) accessible to personal computer 12. Three exemplary storage locations M include a CD 92 or floppy disk 94 utilized in conjunction with CD drive 39 or disk drive 40, respectively; mass storage 46, such as a personal computer hard drive; and a memory module 96 mounted on processing card 30 and accessible to microcontroller 58 via line 98. Memory module 98 also can be utilized in a variety of other types of devices, including hand-held remote devices. The information also can be downloaded over a network, e.g. the Internet, to a storage location M, such as a computer hard drive. Potentially, storage location M can be at a remote network location, such as on a server 91, as illustrated in FIG. 4.

According to one exemplary methodology, a CD 92 or a floppy disk 94 is supplied to a radio station's listeners. The CD 92 and/or floppy disk 94 typically contains, for example, text, audio content, visual content or complex audiovisual information related to the radio station programming. For example, there may be substantial information related to the music and musicians played by the radio station during a given time period. Additionally, there may be data related to the station's advertisers including information relating to products, services and the ordering of such products and services.

When the user receives disk 92 or 94, he or she simply inserts it into CD drive 39 or disk drive 40 and downloads the information to the disk drive of the computer, i.e. mass storage 46. (As mentioned above, the overall system can be designed to store the subject information in a variety of locations.) Depending on the specific location, the data trigger 37 carried on the RDS, MBS or other signal is designed to facilitate location of relevant data from the stored information for viewing by the user. It should be noted that the relevant information also can be downloaded over the Internet from, for example, a radio station website.

As described more fully below, when the RDS or MBS signal is received, the user is provided with a prompt at display screen 20. Upon clicking the prompt by, for example, mouse 18 the stored information is accessed in storage location M, e.g. mass storage 46. Preferably, the data trigger 37 provided by the RDS/MBS signal is addressed to correspond to the storage location of particular information related to the actual programming being broadcast at that time. Thus, if the individual is listening to a song of particular interest on the radio data reception system 28, the data trigger can be used, via the prompt on display screen 20, to access information related to the specific song or group performing the song.

For example, musical selections played by a given radio station may be cataloged according to their CD VPS unique identification numbers, and the data trigger can contain corresponding identification data to locate the specific relevant information from storage location M. The computer simple retrieves the identification number from the RDS frequency receiver as a specific song is played. During an advertisement, on the other hand, a unique advertisement identification number carried by the RDS/MBS signal links the user to stored information about the advertiser. The format and utilization of a data trigger on the RDS/MBS signal depends on the overall design of radio reception system 11 and the preferred storage location for the information, but it is within the skill of one of ordinary skill in the art.

It should be noted that receiver 54 typically is designed to receive radio signals, e.g. FM radio signals, transmitted from one radio station or a limited number of radio stations within a related group. This allows the particular radio station or stations to provide information related to their specific programming for access by an individual listening to the station's programming.

Figure 3:
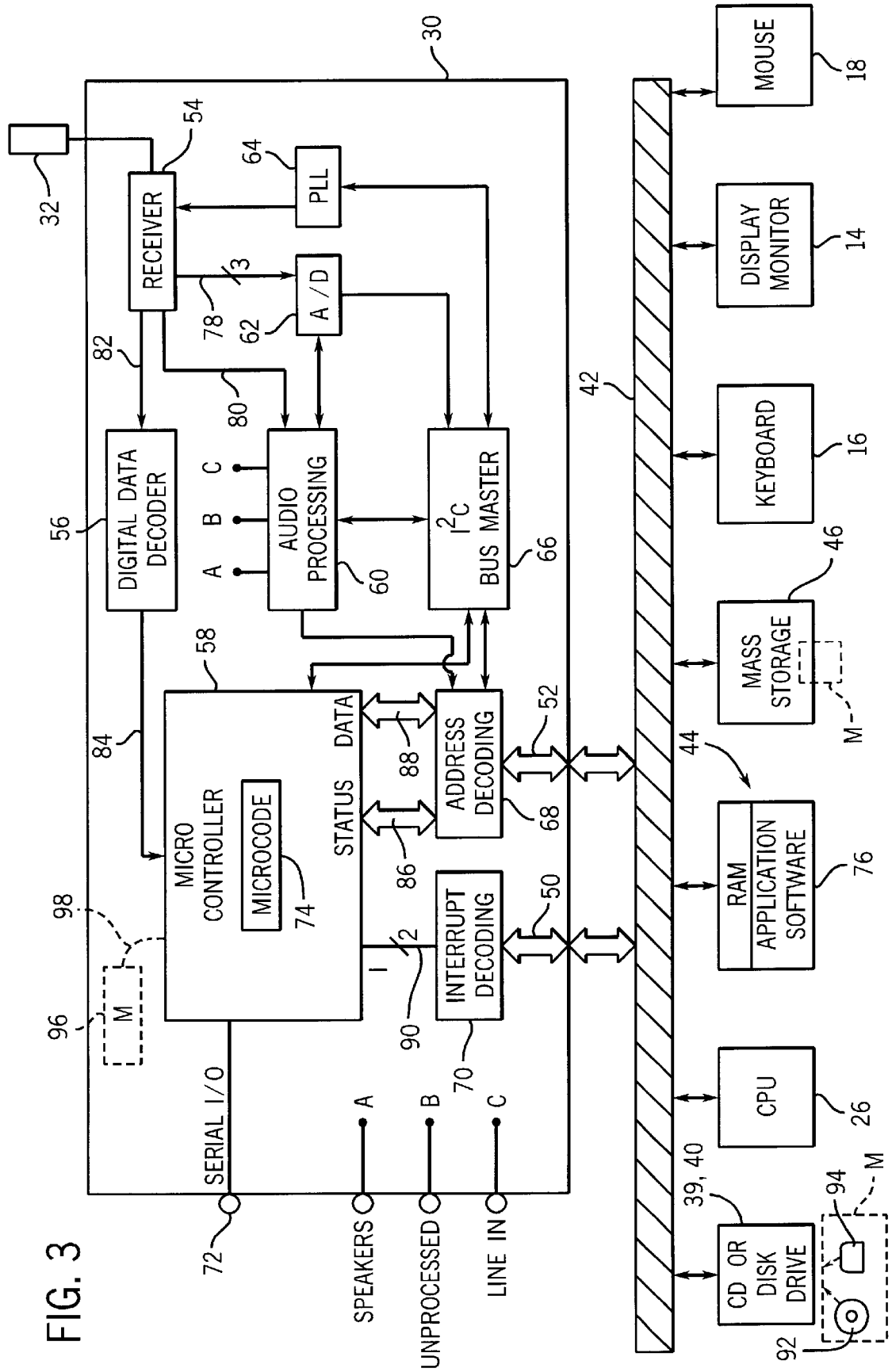
FIG. 3 is a schematic diagram similar to that of FIG. 2 but showing various memory locations for storing data related to a particular FM radio broadcast.
Figure 4:
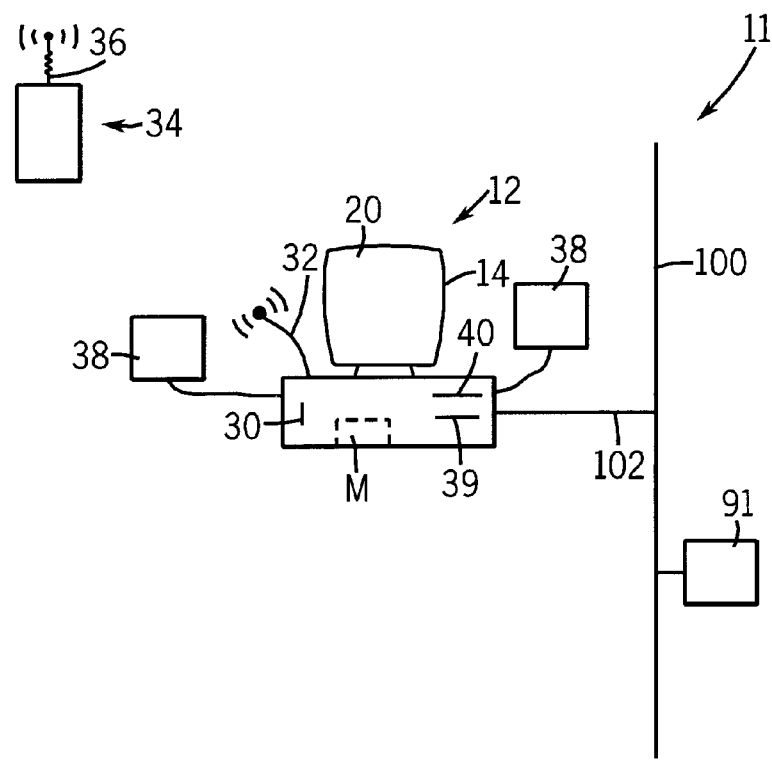
FIG. 4 is a schematic diagram representing one exemplary topology for the overall system described herein.

Another advantage of the system described with reference to FIG. 3 is the ability of the system to provide a user with current information related to the FM programming to which he or she is listening, while simultaneously permitting access to unrelated information over a network 100, such as the Internet (see FIG. 4). In the topology illustrated in FIG. 4, a combined personal computer system 12 and radio data reception system 28 is provided for receiving a primary FM radio broadcast signal as well as an RDS/MBS signal from radio station 34. Simultaneously, personal computer 12 is coupled to network 100, e.g. the Internet, via an appropriate modem and connection 102. Thus, an individual can simultaneously utilize personal computer 12, listen to an FM radio broadcast from radio station 34, obtain and send information over network 100, and access relatively large amounts of data from memory location M that is related to the programming being broadcast at that given time.

Figure 5:
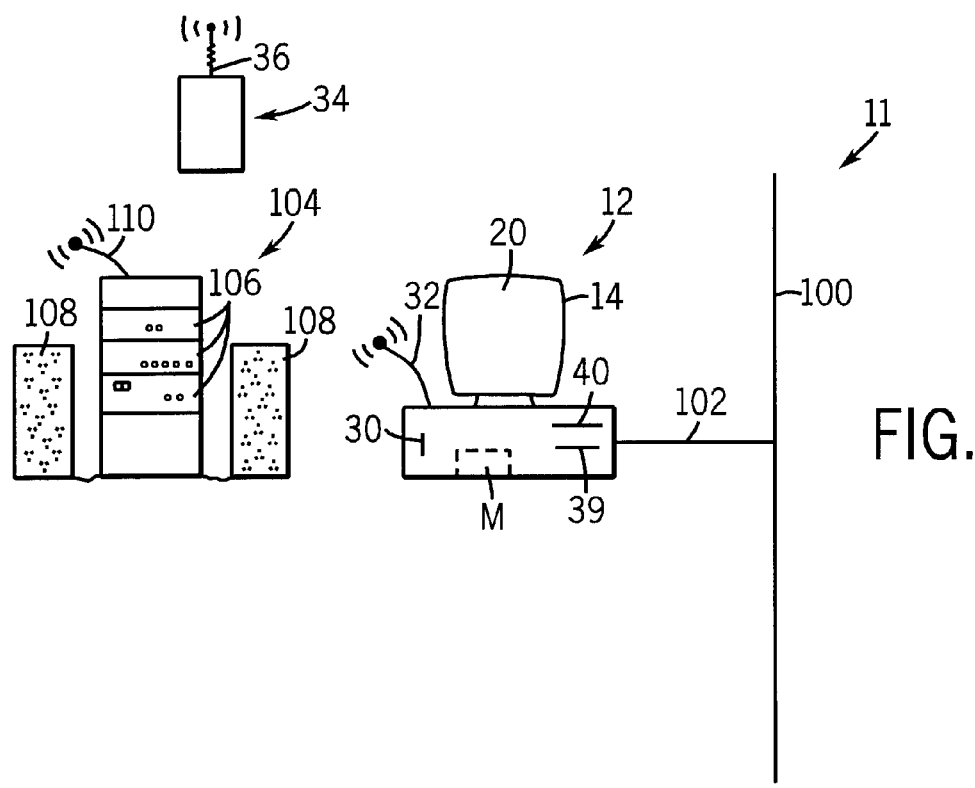
FIG. 5 is a schematic diagram similar to that of FIG. 4 but showing an alternate, exemplary topology.

Even though the system illustrated in FIG. 4 is an exemplary system, the overall system 11 can have a variety of designs and topologies. As illustrated in FIG. 5, for example, personal computer 12 can be utilized in conjunction with a separate radio receiver system 104. In this particular topology, card 30 and receiver 54 may be designed to receive only the RDS/MBS signal related to the programming being broadcast over the primary FM radio signal to radio receiver system 104. This topology permits use of a wide variety of stereos and other radio reception systems that may be more amenable to an individual's preferences in stereo components 106 and audio speakers 108. In this embodiment, the primary FM radio signal is received by an antenna 110 of radio receiver system 104, and the RDS/MBS signal is received by antenna 32 attached to card 30. Even though the FM programming is played on a separate system, the simultaneously broadcast RDS/MBS signal received by card 30 permits simultaneous access to additional information stored at memory location M, and related to the primary programming. Also, radios may be integrated with other hand-held devices or even provided with an appropriate processor and memory M to permit the listener to access prestored information on the portable radio or other device.

Figure 6:
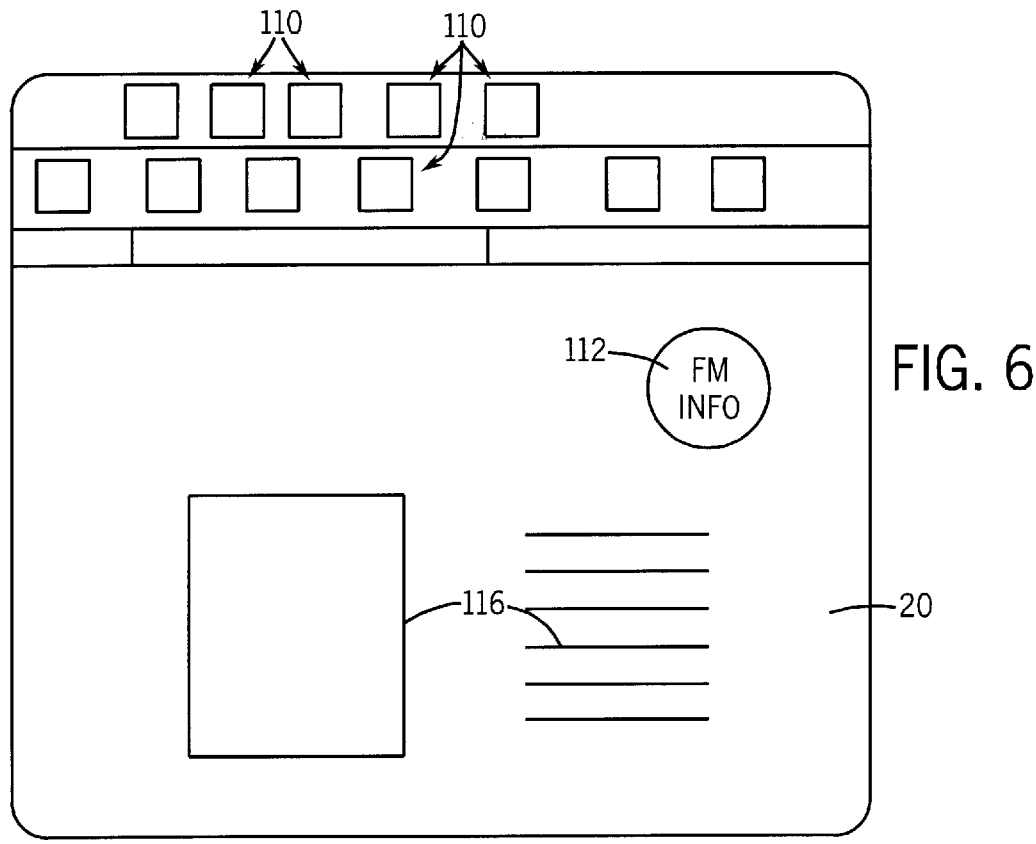
FIG. 6 is a diagram of a graphical user interface that permits a user to simultaneously utilize a personal computer and obtain information related to a current FM radio broadcast.
Figure 7:
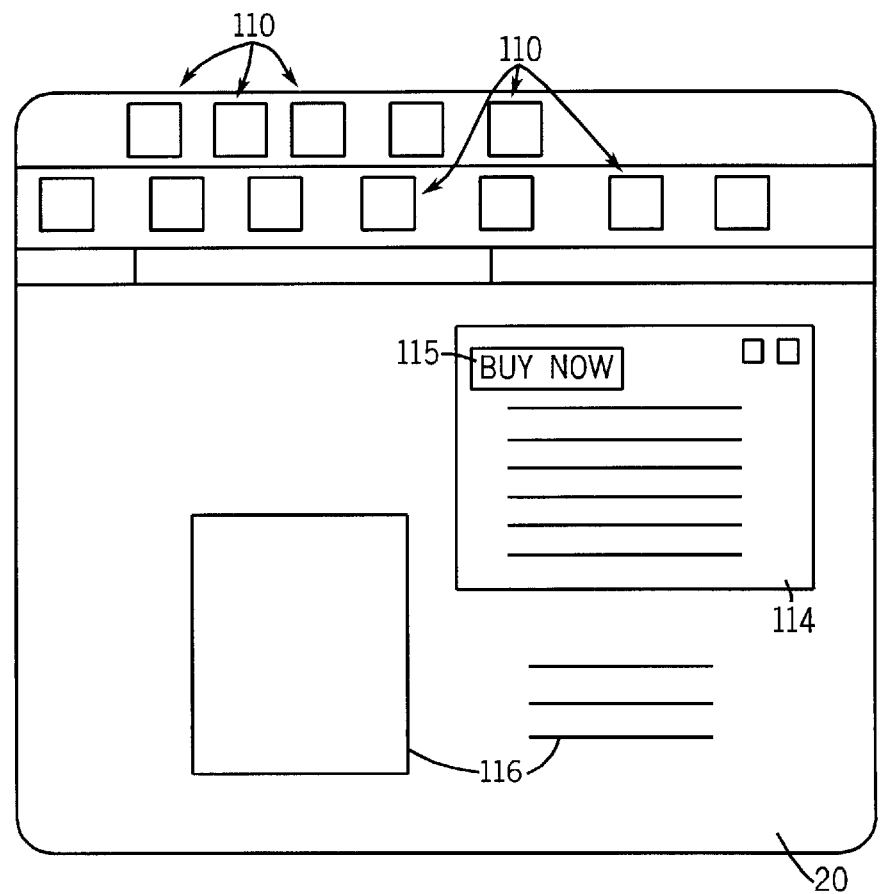
FIG. 7 is a diagram similar to that of FIG. 6, but showing the present systems capability for retrieving information related to the current FM radio broadcast while utilizing or obtaining other information, such as that available over the Internet.

Referring generally to FIGS. 6 and 7, exemplary display screens are illustrated. Although a variety of graphical user interfaces may be utilized, a typical personal computer interface utilizes a Windows-style screen having a plurality of prompts 110 that allow the user a "point and click" format to interface with the personal computer. For example, as is commonly known, a mouse can be used to move a cursor and click on the various indicators or prompts. Similarly, an exemplary embodiment of the present invention utilizes a prompt 112 that is visible on display screen 20 when RDS/MBS signals are being received via radio data reception system 28.

The application software permits a user to simply point and click on prompt 112 to obtain access to the information stored in memory location M and related to the primary programming broadcast by radio station 34. When an individual points and clicks on prompt 112, a desired stored information 114 is displayed on screen 20, as illustrated in FIG. 7. Preferably, the data trigger carried by the RDS/MBS signal also contains address/file/desired information, e.g. CDVPS identifiers, related to specific subject matter of the primary FM broadcast being received at that specific time.

Thus, when the individual clicks on prompt 112, he or she is provided with information 114 that is specifically related to the then current programming. As mentioned, the listener may have established accounts with Internet CD vendors or advertisers so that by clicking on a box 115 labeled, for example, "Buy now" on their personal computer monitor, an order will be placed for the song or advertised item as it is heard using unique identification numbers assigned to products, services or music selections and broadcast over the RDS or MBS system.

Also, the storage of information related to the FM radio broadcast at storage location M permits a user to obtain information about the radio broadcast programming without interrupting other applications 116 being used on computer system 12. For example, the user may be sending or retrieving information over the Internet (network 100) while retrieving information related to a specific song or other programming without interrupting his or her utilization of the network. Potentially, this provides the user an efficient method for ordering information or products over the Internet that are related to the music, advertisements or other material being broadcast by FM radio station 34. This ability can be tremendously helpful for both the radio station and advertisers alike.

Figure 8:
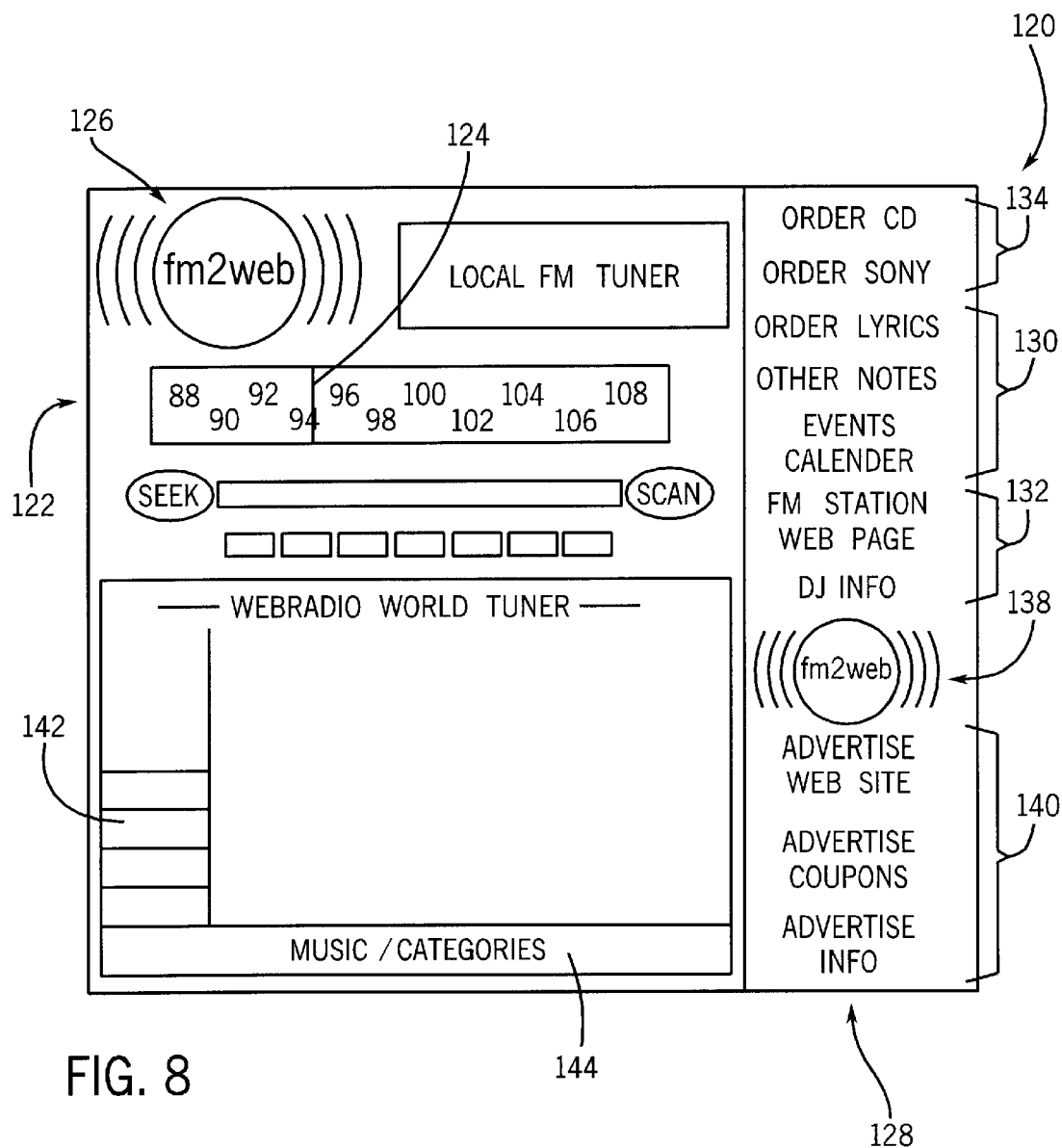
FIG. 8 is an exemplary graphical interface for controlling FM radio broadcast reception and initiating a variety of other applications.

Referring generally to FIG. 8, another graphical user interface 120 is illustrated. This exemplary interface includes a tuner 122 listing the FM radio frequencies. A tuner bar 124 may be moved to select the desired radio station when a user clicks on and drags the tuner bar to the desired radio station frequency.

Additionally, an indicator 126, such as the system "fm2web" logo in the upper left flashes or vibrates to indicate reception of an RDS signal carrying appropriate data triggers. Upon reception of the RDS signal, a selection bar 128 appears to provide a user with a variety of options for obtaining additional information. For example, if a song is playing on the radio, a user may obtain lyrics, liner notes, or an events calendar related to the band or other events by clicking on the appropriate prompt 130. The CD VSP number, for example, may be used as described above to automatically provide the user with related, prestored information on display screen 20.

A variety of other types of information also may be prestored. For example, local concert schedules and community events, radio station information and disc jockey information also may be made available to a user through appropriate prompts 132. If the system is connected to the Internet, connections can be made to the FM station web page, and CDs or songs can be automatically ordered via clicking on the appropriate prompt 134. If a listener clicks on a box/prompt to order a CD or song, a subprogram 136 (see FIG. 9) automatically places an order with a previously selected web CD vendor either at that moment or when the computer is next online. The subprogram simply provides the CD vendor with the unique CD VSP number from the song being broadcast while the listener selected the appropriate prompt 134. Other information, such as the time and date of the buy order as well as station call letters can be automatically included in the order for the sake of records, sales commission allocation, etc.

When an advertisement plays, a second indicator 138 flashes or vibrates to draw a user's attention to a variety of choices related to the advertiser and to prestored information regarding that advertiser. The user is prompted by one or more prompts 140 to, for example, print a preloaded advertiser coupon, obtain additional preloaded advertiser information and/or obtain access to the advertiser's website in either preloaded form or by use of the Internet. The stored information is automatically accessed by the data trigger carrying the unique advertiser identification number.

Graphical user interface 120 can be adapted to illustrate or provide access to other information. For example, a lower tuner bar 142 can be utilized to scroll through live FM Internet broadcasts from around the world. Additionally, a lower bar 144 may be used to allow a listener to click and scroll through choices of Internet music groupings by tapping lower bar 144 at the bottom of tuner bar 142.

Figure 9:
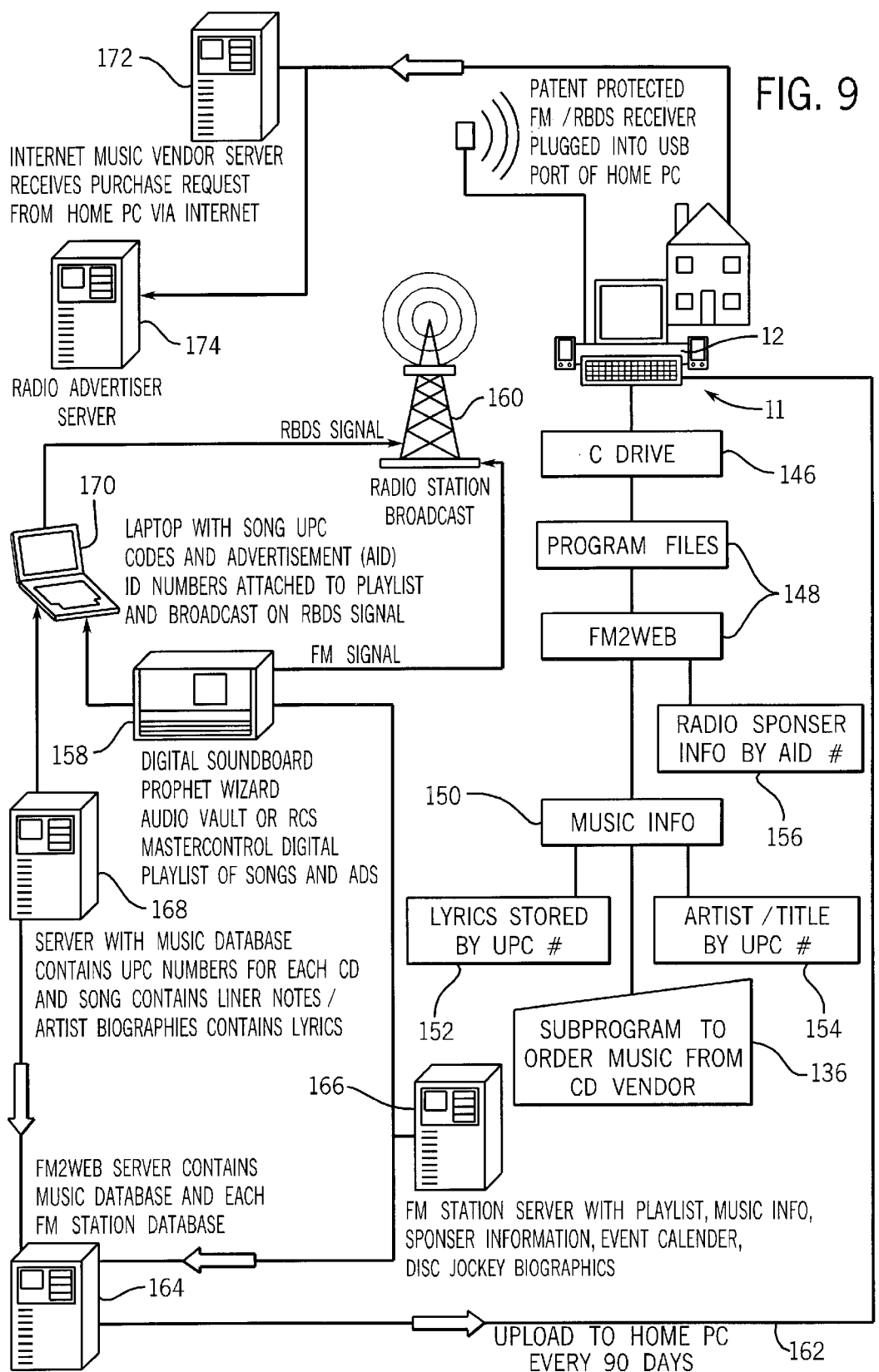
FIG. 9 is a schematic representation of an overall multimedia application system.

An overall illustration of an implementation of the present inventive system may be described with reference to FIG. 9. In this exemplary illustration, radio reception system 11 is embodied in personal computer 12 that typically includes a memory location M, such as C:drive 146. Additionally, system 11 may include a variety of program files 148, as described above, that permit the utilization of an RDS/MBS signal to automatically access pertinent information, such as music information 150, lyrics 152, artist/title 154 and advertiser information 156, during the broadcast of a particular song or advertisement. Preferably, system 11 also includes subprogram 136 that permits an individual to automatically order products, such as CDs. Such subprograms are commonly used by Internet retailers.

A radio broadcast may be initiated, for example, by a digital soundboard 158, such as a Profit Systems Wizard, RCS Master Control System or a Broadcast Engineering Audio Vault. Digital soundboard 158 works in cooperation with a radio station broadcast tower 160 that broadcasts signals which are picked up by the FM/RDS receiver of system 11. The FM/RDS receiver 28, for example, may be plugged into the USB port of a personal computer.

In this particular embodiment, the preloaded information stored in memory M of system 11 is provided via an Internet link 162. Link 162 permits the use of a primary server 164 that periodically, e.g. every 90 days, provide the pertinent artist and advertiser information to personal computer 12. The appropriate information can be downloaded to primary server 164 from a variety of sources. For example, along with digital soundboard 158, the radio broadcast station may utilize a server 166 containing information, such as play lists, music information, sponsor information, events, calendars and disc jockey biographies, that may be sent to primary server 164. Additionally, a music database server 168 can be utilized in providing primary server 164 with appropriate UPC numbers or CD VPS numbers for each song as well as advertiser identification numbers related to each advertiser. This information, along with other information, such as lyrics, liner notes, and artist biographies can be provided to primary server 164. The information is then periodically supplied to computer 12 via uploads over the Internet or direct mailings of, for example, CDs or floppy disks containing the recorded information.

Furthermore, a control computer 170 may be connected to music database server 168 and digital soundboard 158. Control computer 170 can be utilized in applying the appropriate data trigger to the RDS signal as each song or advertisement is broadcast via broadcast tower 160.

Preferably, system 11 also allows a user to automatically order products or information related to the current programming, as described above. For example, during the playing of a particular song, a user can simply click on the appropriate prompt and place an order for the song or CD from a selected music vendor. Typically, the order or request is processed by an appropriate server 172 utilized by the music vendor.

Similarly, additional information or products related to an advertisement can automatically be requested or ordered, provided the advertising party has online retailing capability and is able to process the order/request, as represented by server 174.

Figure 10:
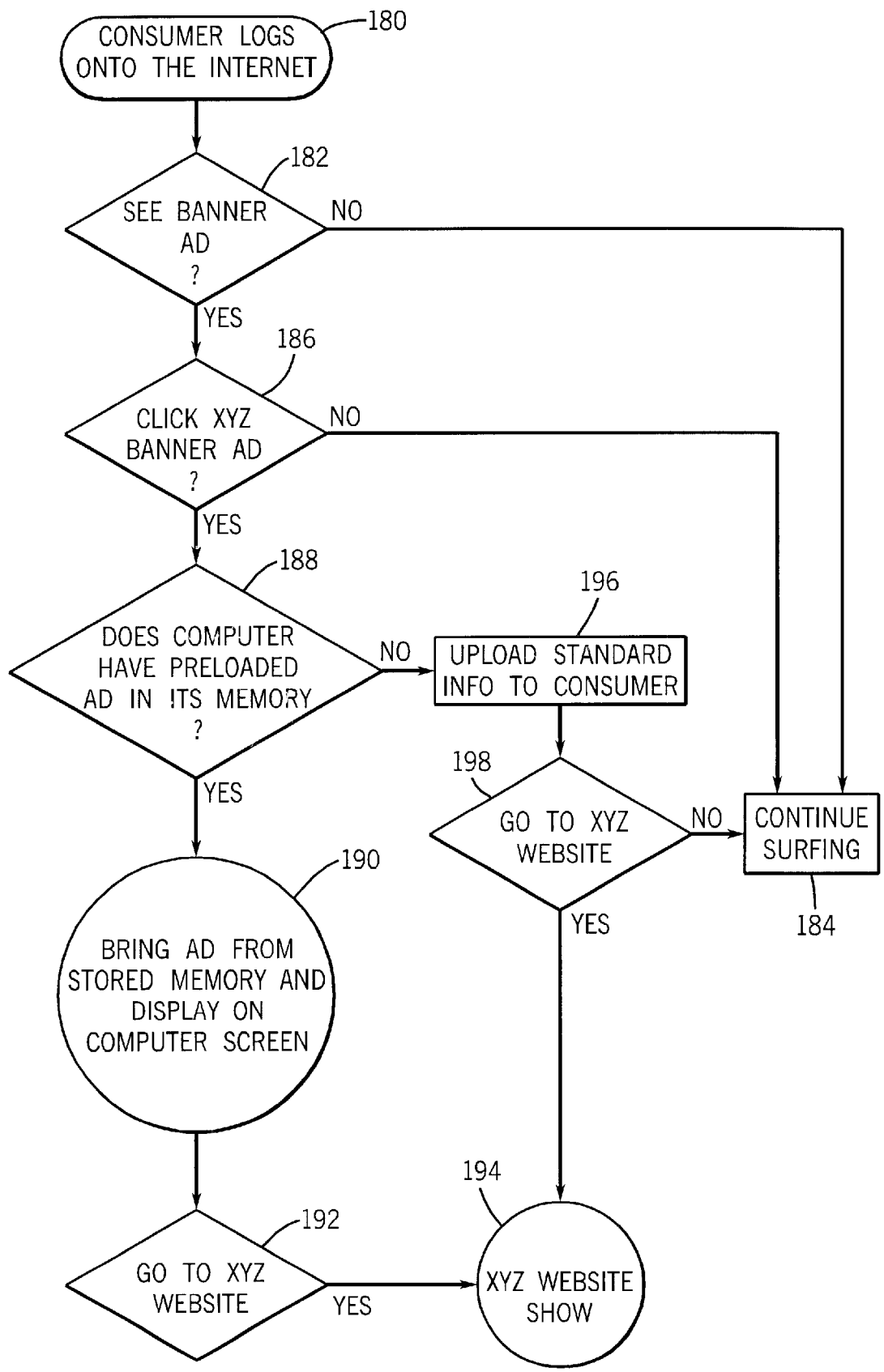
FIG. 10 is a flow chart representing the process of selecting additional stored information related to information transmitted over a media, such as the Internet.

Referring generally to FIG. 10, one example of the functionality of the present system, with regards to the Internet, is illustrated in flow chart form. In this example, an individual logs onto the Internet as indicated by block 180. If an advertisement is displayed or broadcast, the individual may see a banner ad, icon or other symbol, as illustrated in block 182. If the consumer does not see the ad or is not interested, he or she can continue surfing the Internet or continue performing other work at the receiver system, e.g. personal computer 12 (see block 184). If the individual wishes to learn more about the advertiser or its products, he or she clicks on the ad, as indicated by block 186. If enhanced information about the advertiser or its products is preloaded at a memory location M (block 188), the enhanced information is immediately brought to the individual's attention on the display screen, as indicated in block 190. With a conventional modem, downloading the enhanced information may require substantial time. However, by preloading the enhanced information, the user is provided with rapid access to the enhanced information, thereby simulating a broadband download.

The functionality may be designed to incorporate additional features. For example, the advertiser related materials may provide a link to the advertisers website (block 192). By clicking on the appropriate hot link, for example, the individual can utilize the Internet to view the advertisers website, as indicated in block 194.

If information on the advertiser has not been preloaded into memory M (see block 188), the program can be designed to upload standard information via the Internet, as indicated in block 196. Additionally or in the alternative, the program can prompt the individual to view additional information on the advertiser's website, as indicated by decision block 198.

The functionality illustrated in FIG. 10 is one example of how information preloaded into a device, such as a personal computer, can be utilized to provide a viewer or listener quick access to additional enhanced information related to Internet advertisements or other information provided via the Internet. It will be understood that the foregoing description is of preferred exemplary embodiments of this invention, and that the invention is not limited to the specific forms shown. For example, a variety of radio wave receiver systems, other broadcast reception devices, computer systems and data triggers may be utilized; the form and arrangement of computing systems, entertainment systems and reception devices may change while still incorporating the present invention; the circuitry and electrical components can be adjusted according to specific applications; and the information related to the FM broadcast, television broadcast, cellular broadcast, cable broadcast, etc. can be stored in a variety of locations, including a networked location, although it is preferred that the information be stored in a location that does not require the interruption of network usage. These and other modifications may be made in the design and arrangement of the elements without departing from the scope of the invention as expressed in the appended claims.

What is claimed is:

1. A method for rapidly accessing information related to a media display, comprising:

storing segments of enhanced information, related to corresponding segments of a media display, on a device configured to received the media display;

providing the device with a user interface;

prompting an individual to retrieve a segment of enhanced information as the corresponding segment of the media display is displayed; and retrieving the segment of enhanced information upon response to the prompting.

2. The method as recited in claim 1, wherein storing comprises storing information on a personal computer.

3. The method as recited in claim 1, wherein storing comprises storing information on a hand-held remote device.

4. The method as recited in claim 1, wherein providing comprises providing the device with a graphical user interface via a display screen.

5. The method as recited in claim 4, wherein prompting comprises displaying a selectable icon on the display screen.

6. The method as recited in claim 4, wherein prompting comprises providing an audible prompt.

7. The method as recited in claim 4, wherein prompting comprises pointing and clicking a selection by an individual at the display screen.

8. The method as recited in claim 1, wherein retrieving comprises displaying an enhanced visual segment of information.

9. The method as recited in claim 1, wherein retrieving comprises playing an audible segment of information.

10. The method as recited in claim 1, further comprising broadcasting the media display.

11. The method as recited in claim 10, wherein broadcasting comprises broadcasting by radio waves.

12. The method as recited in claim 10, wherein broadcasting comprises broadcasting via cellular communication.

13. The method as recited in claim 10, wherein broadcasting comprises broadcasting over a cable network.

14. The method as recited in claim 1, further comprising making the corresponding segments of the media display available via the Internet.

15. The method as recited in claim 4, further comprising transmitting a purchase request over the Internet.

16. A method for rapidly providing an individual with information related to a currently broadcast media, comprising:

broadcasting selected segments of data via a broadcast medium for reception by a plurality of remote receivers;

broadcasting a unique data trigger simultaneously with each selected segment of data;

receiving the selected segments of data and the unique data trigger at a receiver system;

preloading the receiver system with information related to the selected segments of data; and prompting a user of the receiver system to utilize the data trigger for automatic retrieval of information related to the currently broadcast selected segment of data.

17. The method as recited in claim 16, wherein broadcasting selected segments of data comprises broadcasting via radio waves.

18. The method as recited in claim 16, wherein broadcasting selected segments of data comprises broadcasting over a cable network.

19. The method as recited in claim 16, wherein broadcasting comprises utilizing the Internet.

20. The method as recited in claim 16, wherein broadcasting selected segments of data comprises broadcasting over a cellular network.

21. The method as recited in claim 17, wherein broadcasting the unique data trigger comprises broadcasting the unique data trigger via RDS.

22. The method as recited in claim 16, wherein preloading comprises storing information on a hard drive of a computer.

23. The method as recited in claim 16, wherein preloading comprises storing information on a remote hand held device.

24. The method as recited in claim 16, wherein receiving comprises playing an audible segment of data.

25. The method as recited in claim 16, wherein receiving comprises displaying a visual segment of data at a display screen.

26. The method as recited in claim 16, wherein prompting comprises pointing and clicking a selection by an individual at the display screen.

* * * * *